March 12, 1940. J. B. KESSEL 2,193,515
MOTOR
Filed Dec. 24, 1936 2 Sheets-Sheet 1
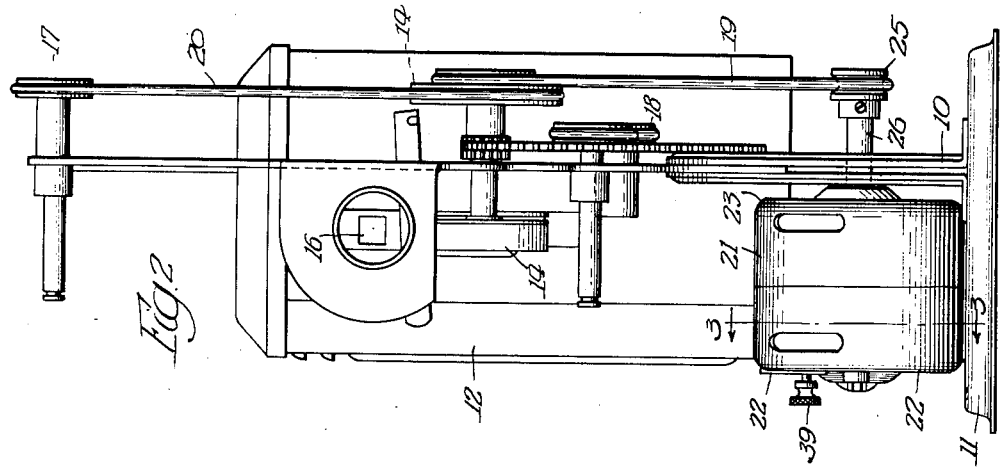
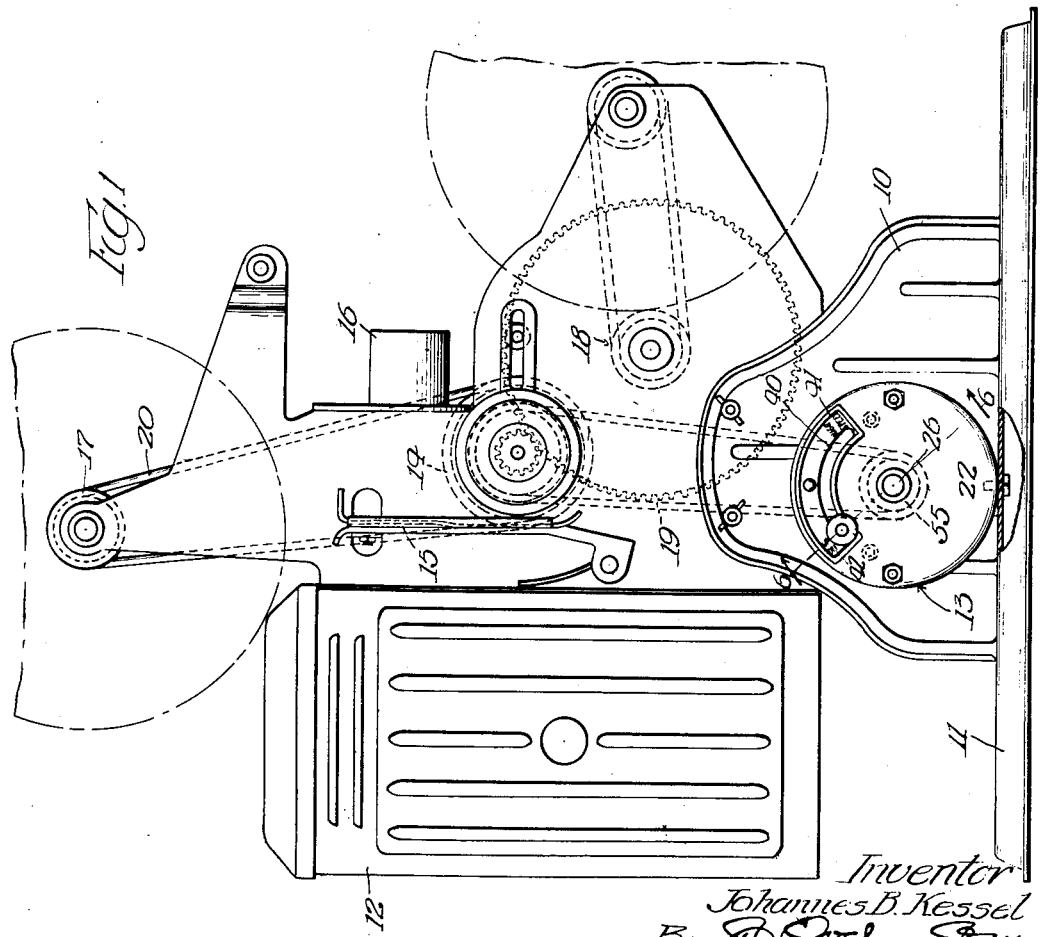
Inventor
Johannes B. Kessel

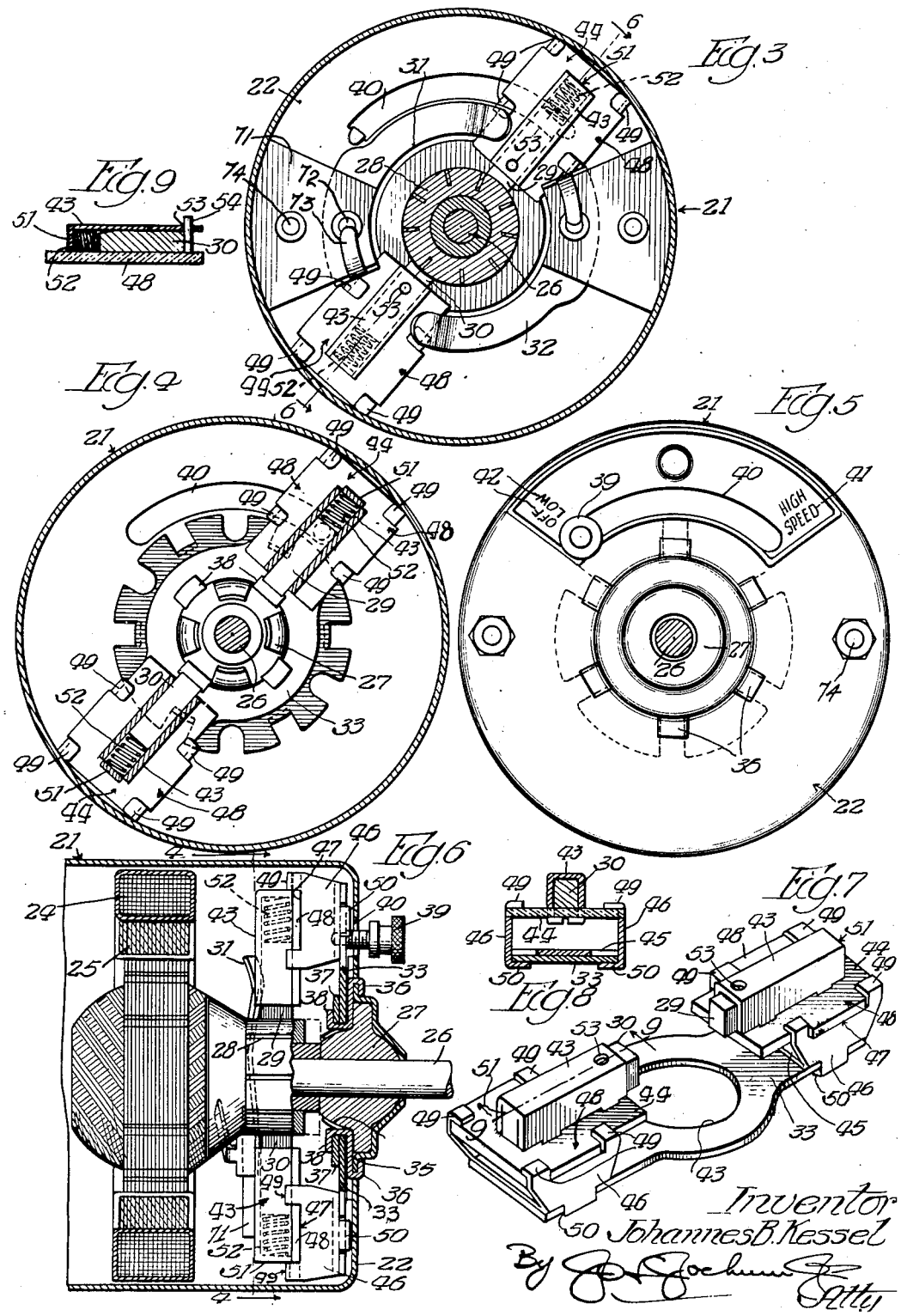

Patented Mar. 12, 1940

2,193,515

UNITED STATES PATENT OFFICE 2,193,515

MOTOR

Johannes B. Kessel, Chicago, Ill., assignor to Vidrio Products Corporation, a corporation of Illinois Application December 24, 1936, Serial No. 117,571

4 Claims. (Cl. 171—324)

This invention relates in general to motors for use with motion picture apparatus and means for actuating the same, but more specifically the invention relates to improved means whereby the speed of operation of the actuating means may be varied to vary the speed of advancement of the film.

While the preferred exemplification of the invention is shown as a motion picture apparatus, the invention also embodies a motor unit which is well adapted for many and various uses, and one of the objects of the invention is to provide a motor in which improved means are employed for varying the speed of rotation of the motor, without the use of an expensive rheostat or other expensive control mechanism, thereby resulting in a device which is more simple in construction and less expensive to manufacture and to maintain.

To the attainment of these ends and the accomplishment of other new and useful objects as will appear, the invention consists in the features of novelty in substantially the construction, combination and arrangement of the several parts, hereinafter more fully described, claimed and shown in the accompanying drawings illustrating this invention, and in which:

Figure 1 is a schematic side view of a motion picture projecting apparatus constructed in accordance with the principles of this invention.

Figure 2 is a right hand end elevation of Figure 1.

Figure 3 is a detail sectional view taken on line 3—3 Figure 2 on an enlarged scale.

Figure 4 is a detail sectional view taken on line 4—4 Figure 6.

Figure 5 is a right hand end elevation of Figure 6.

Figure 6 is a detail sectional view taken on line 6—6 Figure 3.

Figure 7 is a detail perspective view, on an enlarged scale, of the brush carrying regulator member.

Figure 8 is a detail sectional view.

Figure 9 is a detail sectional view taken on line 9—9 Figure 8 showing one of the brushes retracted and held in a retracted position.

In the drawings there is illustrated the structure in co-ordination with a motion picture apparatus, the same comprising a motion picture projector embodying a support or pedestal 10 mounted upon a base or platform 11 and supported by the pedestal is mounted a housing or casing 12 containing the lamp and other appurtenances found in a motion picture projector.

Included in the structure is an electric motor designated generally by the reference numeral 13 that drives the film feeding mechanism of which the intermittently advanced film engaging sprocket is a part and operates to intermittently move the film in the passageway 15 behind the projecting lens tube 16. The film is drawn from an upper spool 17 downwardly through the film passageway 15 and is wound upon the film reel 18, motion being imparted to the film reels and to the feeding mechanism 14 by means of belts 19 and 20, all as usual in an apparatus of this character.

The motor unit is illustrated on a larger scale in Figures 4 to 8 and in the present embodiment of the invention the motor unit is of the series commutator type and embodies a casing 21 provided with front and rear walls 22 and 23.

Within the casing is arranged the field windings 24 and rotatable armature 25, the shaft 26 of the armature being journaled in bearings 27 in the front and rear walls of the casing.

The ends of the respective armature coils are connected to the insulated segments of the commutator 28, fixedly supported on the shaft 26, and the commutator 28 is engaged by the oppositely disposed brushes 29 and 30.

One end of the field coils 24 is attached to one brush contact member 31 and the other end of the coil is attached to the circuit line supply.

One end of the other field coil 24 is attached to the other brush contact member 32 and the other end of this same coil is attached to the line circuit. The circuit is thus from the power line through one field coil, through the brush contact member 31 to one brush, through an armature winding to the other brush, then through the other brush contact member 32 and the other field coil back to the line.

The brush contact members are symmetrically arranged and mounted, and a full description of one will thus suffice. Referring more particularly to the member 31, it will be seen to be attached to and supported by the segmental plate or member 71 of insulating material. This attachment is by the rivet 72, a turned-back tongue portion 73 of the member 31 helping to maintain it in fixed relation to the plate 71. The plate 71 is held in proper position in the motor casing by the spacer bolt 74. By this bolt the plate 71 and member 31 are so positioned (as may be best seen in Fig. 6) that the brush housing 43 contacts such member as it is moved about the axis of the armature. The position shown in Fig. 3 is, of course, the "off" position, with the brush housing out of contact with the member 31; as soon as the brushes are rotated, however, contact is made and maintained, throughout speed-varying movement, by the members 31 and 32.

The numeral 33 designates a control member which may be of any desired size and configuration and constructed of any suitable material. This member is provided with an aperture 34 disposed centrally thereof and is held in position to rotate about the axis of the shaft 26 in any suitable manner such as by means of a member 35 that is secured within the casing 21 and to the wall 22 thereof by means of ears or projections 36 which pass through suitable openings in the casing wall and are flanged down against the outside of the casing.

A washer member 37 also encompasses the bearing 27 and the shaft 26 and a portion of the member 35 projects through the opening in the washer and is flanged down upon the inner face of the washer. This construction will not only support the controller member 33 but will adapt the same to be rotated about the axis of the shaft 26. This adjustment of the member 33 may be accomplished in any desired or suitable manner preferably by means of a screw or knob 39 which is arranged on the outside of the casing and passes through a slot 40 in the wall of the casing, with its extremity threaded or otherwise connected to the controller member 33.

On the outside of the casing may be provided legends 41 and 42 to serve as an indicator with which the knob or handle 39 co-operates to indicate the position of the commutator brushes 29 and 30 with respect to the commutator 28. The brushes 29 are each disposed in a housing 43 that is secured in any suitable manner to a base 44 of insulating material. This base 44 is supported preferably by a substantially U-shaped member 45, the sides 46 of which are notched as at 47, to receive reduced portions 48 of the base 44. The extremities of the walls of the notched portion 47 of the sides 46 are flanged over and upon the base 44 as at 49, thereby not only securing the base 44 in position but also supporting the base 44 spaced from the controller member 33. The side members 46 are provided with ears 50 at their base which are flanged over and upon the controller member 33 thereby securing these parts in position.

The other ends of the housings 43 are closed as at 51 and the brushes 30 are preferably of a configuration to substantially fill the housing. Within the housing and between the closed end 51 and the adjacent end of the brush 30 is arranged a spring 52 which tends normally to hold the ends of the brushes 29 and 30 against the commutator.

In order to facilitate the assembling of the parts and in order to prevent injury to the housings or other parts during assembling, the brushes 29 and 30 are held retracted against the stress of the springs 52 and this may be accomplished by providing in the wall of each of the housings 43 an opening 53 so positioned that the brush may be forced into the housing 43 against the stress of the spring 52, until the extremity of the brush is positioned beyond the opening 53, after which a pin or other implement 54 may be inserted into the opening 53 across the end of the brush to temporarily hold the brush retracted.

This will maintain the brushes out of the way so that the commutator may be positioned between the brushes, after which the pins 54 may be removed and the springs 52 will then urge the brushes forwardly into contact with the armature and yieldingly hold them in such positions.

With the parts thus constructed and in order to vary the speed of rotation of the motor 26, either by accelerating or decreasing the same, it is only necessary to shift the position of the brushes 29 and 30 with respect to the commutator 28 in one direction or the other, according to whether or not the speed is to be accelerated or decreased.

This is accomplished by moving the controller member 33 about the axis of the commutator 28 and shaft 26 by means of the knob or button 39 to any desired position.

The contact members 31 and 32 to which the respective coils of the field are connected are of such a length that the housings 43 which contact and move thereover and by means of which electrical connection is had with the brushes 29 and 30, and the slot 40 is of such a length that the housings 43 may be moved out of engagement with the contacts 31 and 32 to stop the motor by interrupting or breaking the electrical connection between the brushes and the coils of the field 24.

With this construction it will be manifest that extremely simple means is provided for controlling or varying the speed of operation of the motor. At the same time there is produced a structure which is not only simple but which will be extremely cheap to manufacture.

It is also possible with the present invention to vary and control the speed of operation of the motor without the use of expensive rheostats, thereby materially reducing the cost of maintenance.

To the motor shaft 26 is connected a pulley 55 over which one of the belts, to wit, the belt 19, passes for actuating from the motor, a driven element, which constitutes a portion of the apparatus with which this motor is associated.

Obviously the motor may be employed for many other purposes and while the preferred form of the invention is herein shown and described, it is to be understood that various changes may be made in the details of construction, and in the combination and arrangement of the several parts, within the scope of the claims, without departing from the spirit of this invention.

What is claimed as new is:

1. A series commutator motor, a control element encompassing and freely movable about the axis of the commutator, housings carried by the said element, brushes in and projecting from the housings and contacting the commutator, springs in said housings normally urging the respective brushes against the commutator, and means for moving said element, said housings being each provided with an aperture in one wall for the reception of a pin, whereby when the brush is forced into the housing against the stress of the spring and the pin inserted into said aperture, the brush will be held retracted by the pin to facilitate assembling of the commutator and said element.

2. In a motor of the character described, a control element encompassing and freely movable about the axis of the commutator, brush housings, supports to which the housings are secured, anchoring members engaging said element and the said support for securing the housings to the said element and maintaining the housings spaced from the element, brushes in the housings, and springs encased in the housings normally urging the brushes into engagement with the commutator, there being an opening in the wall of each housing for the reception of a retaining pin to hold the respective brushes retracted against the stress of said springs.

3. In a series commutator motor, a control element freely movable about the axis of the commutator, housings carried by said element adjacent the commutator, brushes in and projecting from the housings and adapted to contact the commutator, spring means urging the brush against the commutator, each brush and housing being in electrically conductive contact but insulated from other brushes and housings, and a pair of arcuate contact members arranged substantially concentrically with the axis of rotation of the commutator and so positioned that they are adapted to make contact with said brush housings to complete the circuit through the motor when said control element is moved about the axis of the commutator.

4. A motor of the character claimed in claim 3, wherein said contact members do not compass a full circle and lie in a plane through the armature end of the commutator, and at least one of said brush housings is adapted to be out of contact therewith in one position of said control element.

JOHANNES B. KESSEL.